UNITED STATES PATENT OFFICE.

WILLIAM E. TERRY, OF WYOMING, NEW YORK.

IMPROVED PROCESS FOR TANNING.

Specification forming part of Letters Patent No. 48,740, dated July 11, 1865.

*To all whom it may concern:*

Be it known that I, WILLIAM E. TERRY, of Wyoming, in the county of Wyoming and State of New York, have invented a new and useful Process of Tanning; and I do hereby declare that the following is a full and exact description thereof.

My improved process of tanning is as follows:

Having unhaired the hides, which I do by the use of lime and ashes in equal parts, I handle them in a bate or liquor prepared as follows: I subject the lees of a cider or wine press, or any fruit or refuse thereof which will produce ascetic acid by fermentation, to the fermentative process by steeping them in water at a moderately-warm temperature until the water has acquired about the degree of acidity of weak common vinegar. Where refuse of fruit or fruit itself cannot be economically employed cider-vinegar, or any vinegar that is made from vegetable products alone, may be diluted with three or four parts of soft water, so as to form a weak acid liquor. Handle the hides, if heavy, six or eight hours, or for ordinary calf-skins half that length of time. This acid bate neutralizes the alkali which remains from the lime and ashes. After bating soak in pure soft water two or three days, and work them in the wheel or with the fleshing-knife on a beam once a day, or oftener, when they are ready for tanning, for which I prepare an ooze composed of *Polygonum punctatum*, (commonly known as "smart-weed,") *Mentha viridis*, (spearmint,) and oak, hemlock, sumac, or other bark containing tannin, with or without the addition of *Comptonia asplenifolia* or sweet fern, the before-mentioned ingredients being used in the proportions and prepared in the manner following:

I take, by weight, one part of the dried *Polygonum punctatum*, one part of *Mentha viridis*, and two parts of ground bark of either of the kinds above mentioned, or that is employed in tanning, or a mixture of the same, or any of them, as may be preferred, with or without one part of *Comptonia asplenifolia*, as it may be conveniently or economically procured, which, when it is used, is cut up—the whole shrub, roots and twigs—and mixed with the other ingredients. An ooze or tan-liquor is then prepared from the combined mixture by steeping with water, in the manner that ooze is usually prepared from bark alone.

It is not essential that the foregoing specified proportions be strictly adhered to. They may be considerably varied without materially affecting the ooze obtained therefrom. For instance, more smart-weed and less spearmint may be employed, and vice versa, as they are respectively more or less abundant or easy to be procured. The hides should be handled in this ooze in the usual manner for a length of time varying from four to twelve weeks, or until sufficiently tanned. The effect of the vegetable acid in the bating-liquor on the skins is much better than when sulphuric or other mineral acid is employed, as it does not weaken or impair the strength of the animal tissue or fiber. The smart-weed or spearmint having highly astringent properties gives firmness and strength to the fibers during the process of tanning, while at the same time it renders the leather more soft and pliable and less pervious to water.

What I claim as my invention, and desire to secure by Letters Patent, is—

The process of tanning by means of liquors composed of the several ingredients herein named, when combined in the proportions and employed substantially in the manner herein described.

In witness whereof I have hereunto signed my name in the presence of two subscribing witnesses.

WILLIAM E. TERRY.

Witnesses:
 JAY HYATT,
 LYMAN P. PERKINS.